UNITED STATES PATENT OFFICE.

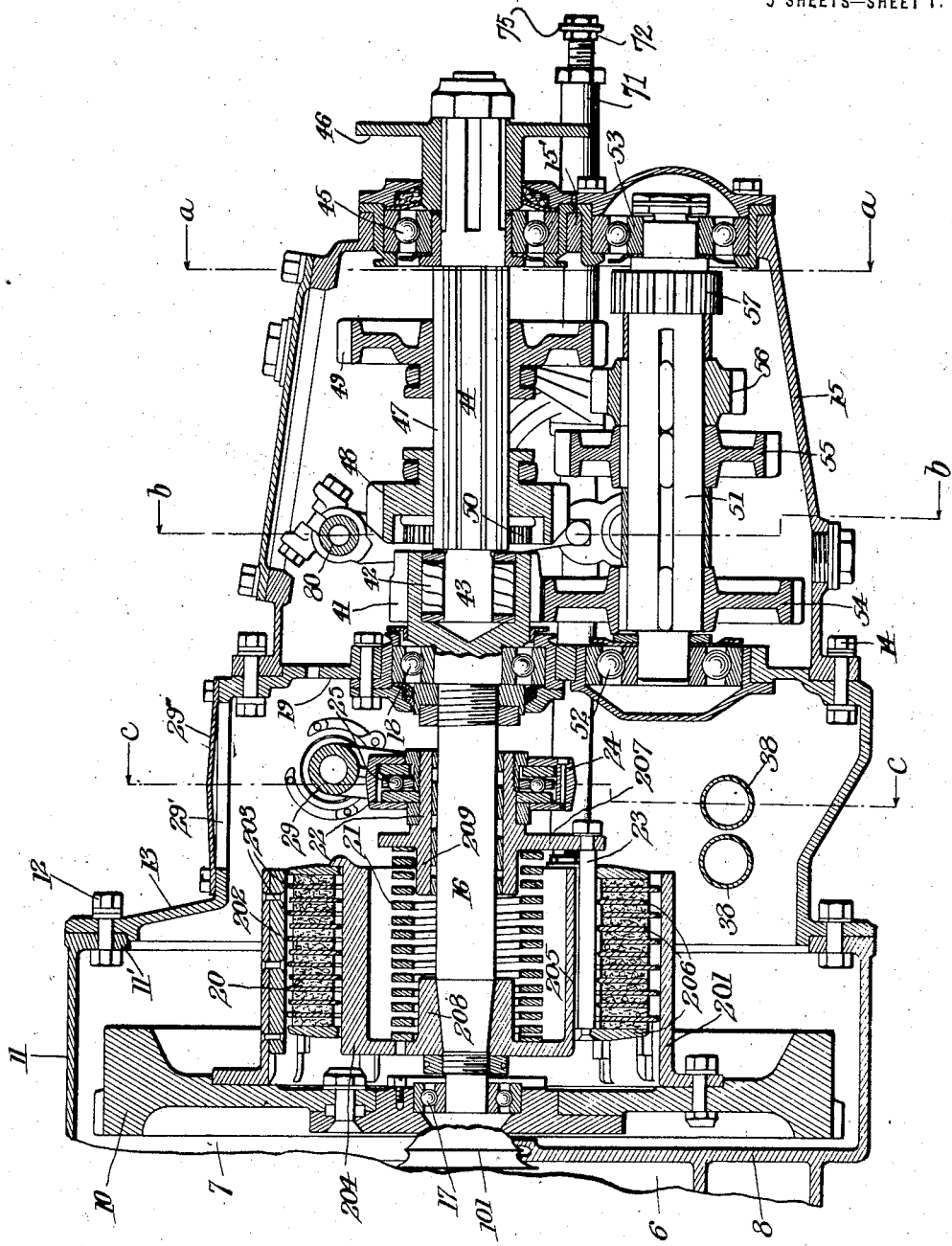

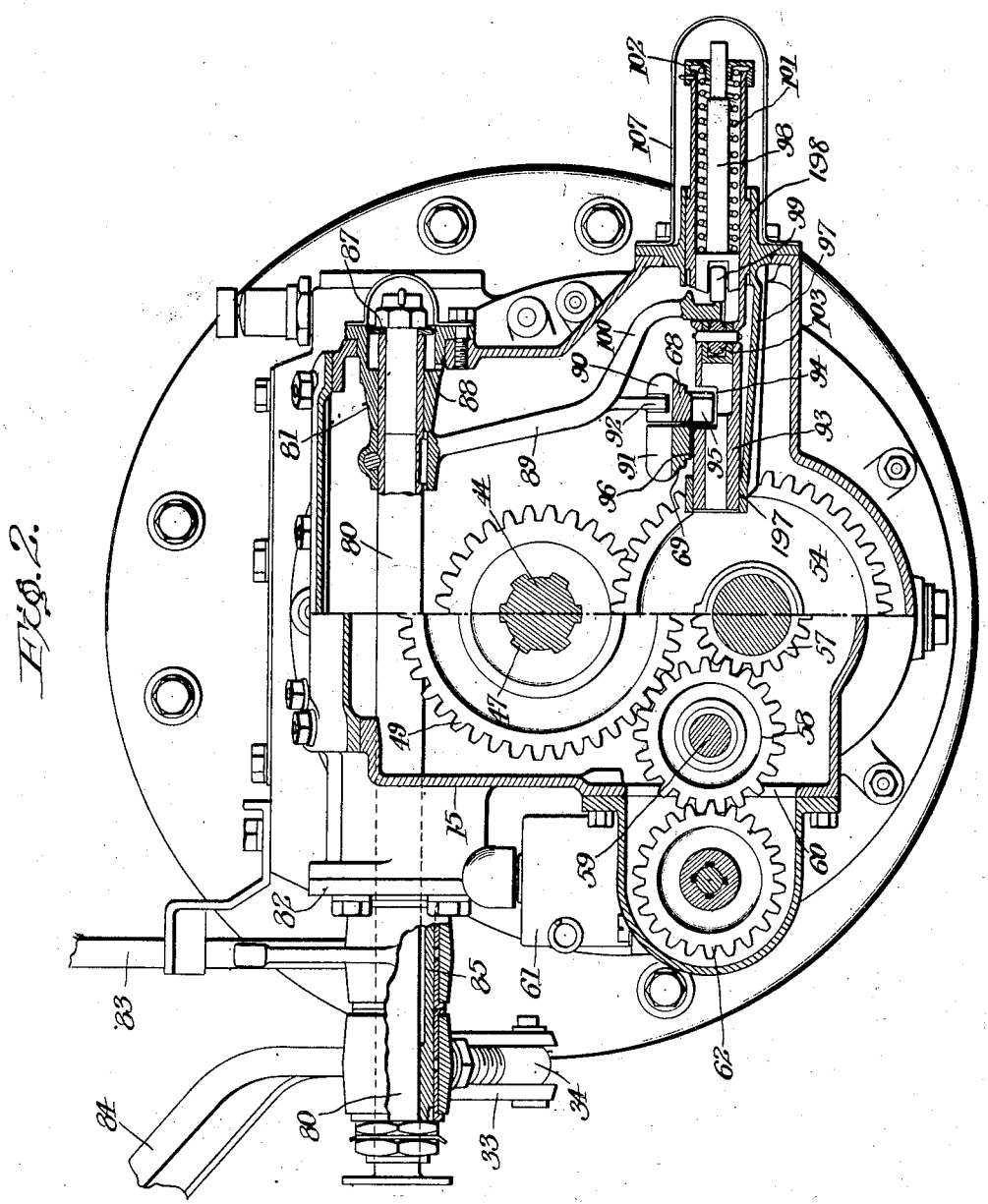

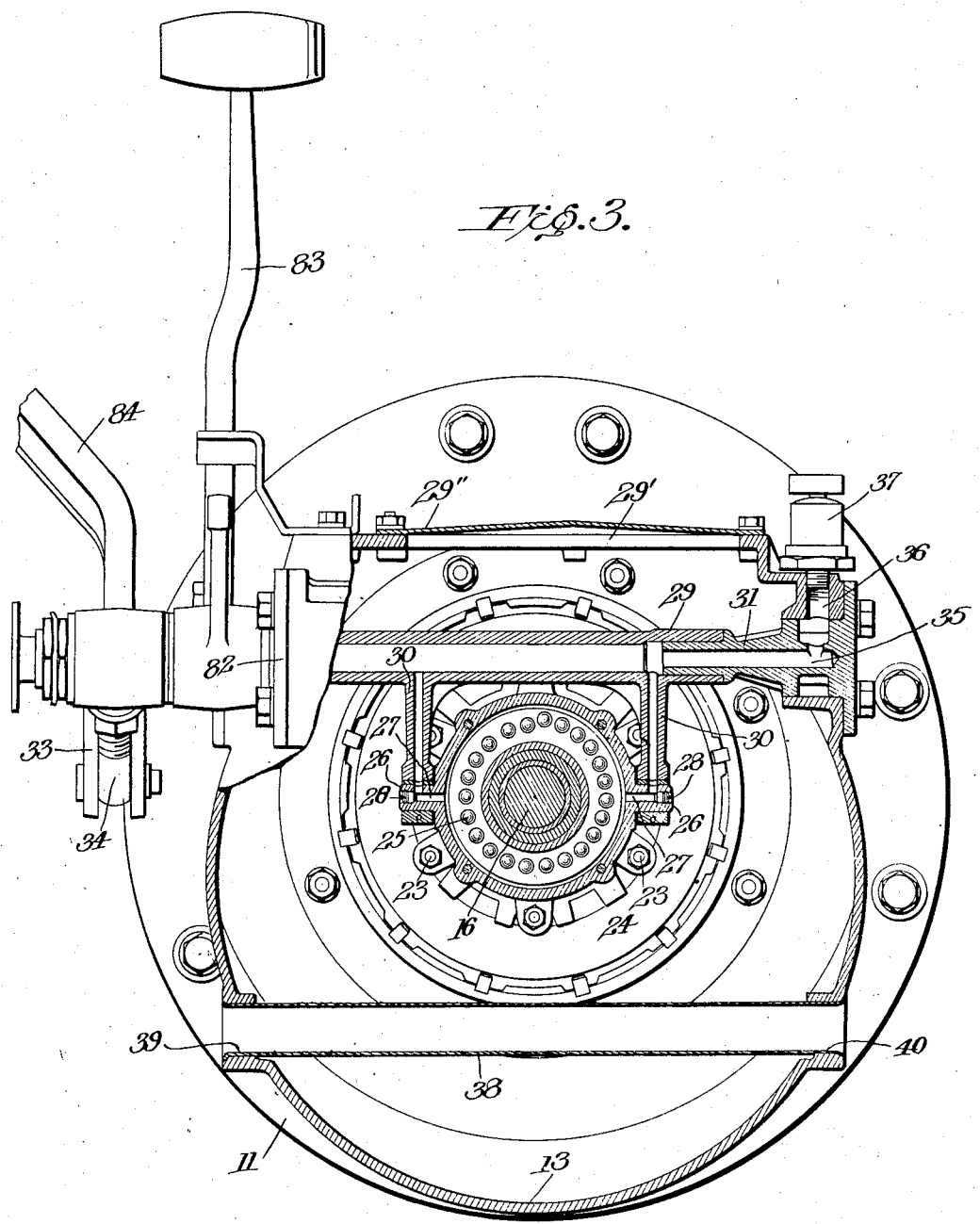

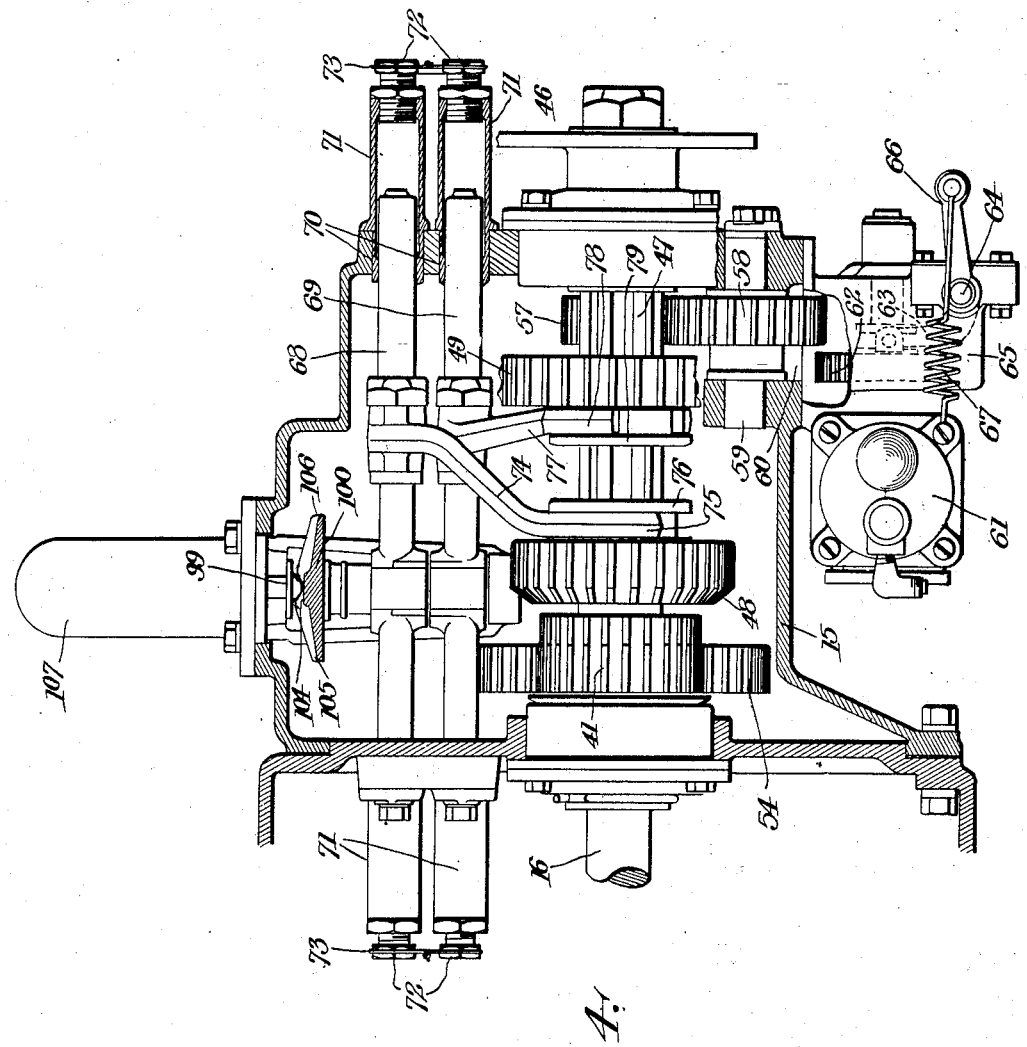

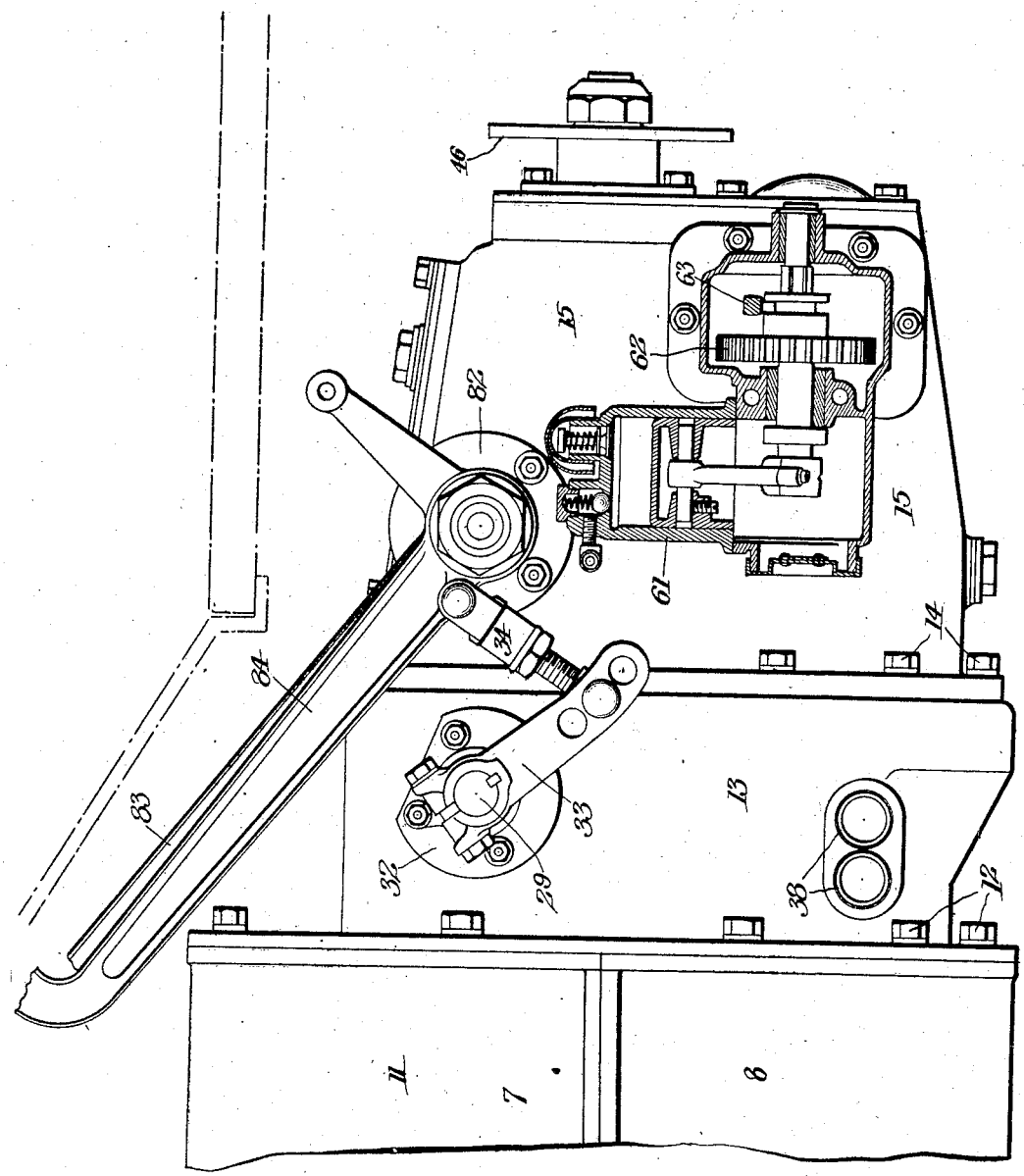

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,297,755.   Specification of Letters Patent.   Patented Mar. 18, 1919.

Application filed January 31, 1916. Serial No. 75,414.

*To all whom it may concern:*

Be it known that I, JESSE G. VINCENT, a citizen of the United States, residing at Detroit, Wayne county, State of Michigan, have invented certain new and useful Improvements in Motor-Vehicles, of which the following is a specification.

This invention relates to motor vehicles and particularly to the transmission mechanism and its supporting casings.

One of the objects of the invention is the provision of a simple and reliable shifting mechanism and also an improved form of drive for an auxiliary pump.

Another object of the invention is the provision of a novel casing and support for the clutch and gearing and their associated parts.

Other objects and the features of novelty will be apparent from the following description, taken in connection with the accompanying drawings, in which:

Figure 1 is a longitudinal section through the clutch and transmission gearing casings of a motor vehicle, embodying my invention;

Fig. 2 is a transverse section partly on the line *a—a* and partly on the line *b—b* of Fig. 1;

Fig. 3 is a transverse section on the line *c—c* of Fig. 1;

Fig. 4 is a horizontal section through the transmission gearing casing with the gearing shown in plan; and Fig. 5 is a side elevation of the casings with the auxiliary pump shown in section.

Referring to the drawings, the rear part of a vehicle motor is shown at 6, the crank case thereof being in upper and lower detachable halves 7 and 8 and having a rearwardly extending part 11 which forms a housing for the motor flywheel 10. The rear end of said part 11 is open and is formed with a flange 11′ to which is detachably secured, as by means of bolts 12, a clutch casing 13. This casing is formed with an open front end and with a bearing supporting rear end or wall 19, and to this wall is detachably secured, as by means of bolts 14, a gear or transmission casing 15. Said latter casing is also formed with an open front end and with a bearing supporting rear end or wall 15′.

As above stated, the inclosing part 11 of the crank case surrounds the flywheel, and it also surrounds the forward part of a clutch 20 which is mounted upon the flywheel and which extends rearwardly where it is housed within the clutch casing 13. Within the gear casing 15 are the transmission gears that will be hereinafter more particularly described, and the bearings for the clutch and gear shafts are supported in the walls of the two casings.

The outer drum or casing of the clutch 20 is indicated at 201, being secured directly to the flywheel 10 and provided with keys 202 upon which slide a series of plates 203. The inner drum or spider of the clutch is shown at 204, being mounted on the driven shaft 16, which has a front bearing 17 in the crank shaft 101 upon which the flywheel is mounted and a rear bearing 18 in the wall 19 of the clutch casing. The drum 204 has a series of longitudinal grooves 205 in which rods 23 may slide and form keys for a second and alternating series of plates 206. A sleeve 22 is slidably mounted on the shaft 16 and has a flange 207 to which the rear ends of the rods 23 are connected. The forward ends of said rods are connected to the front plate 206 of said latter series of plates so that the sliding movement of the sleeve 22 draws the clutch plates together and separates them. For yieldingly holding the clutch in engaging position a spring 21 surrounds the shaft 16 and operates between the front wall of the drum 204 and the flange 207 of the sleeve 22, bosses or hubs 208 and 209 on the drum and sleeve respectively, serving to position the spring.

For the purpose of actuating the sleeve 22 a collar 24 is provided and between this collar and the sleeve there is a thrust bearing 25. The collar 24 has trunnions 26 on opposite sides thereof and these trunnions are preferably provided with ports or passages 27 to convey lubricant to the bearing 25. The outer ends of the passages 27 are closed by plugs 28. A tubular shaft 29 has hollow downwardly projecting arms 30 in which the trunnions 26 are mounted. One end of the shaft 29 is mounted on the tubular stub shaft 31 and the opposite end projects through the bearing member 32 and has secured thereon the arm 33 with which an adjustable actuating link 34 is connected, whereby the shaft 29 may be rocked to shift the sleeve 22. Above the shaft 29 the casing 13 is provided with a relatively large opening 29' through which the shaft 29 may be removed when detached from the parts 31 and 32 and the trunnions 26. The opening 29' is normally closed by a cover plate 29''. A passage 35 in the stub shaft 31 communicates with a passage 36 in the wall of the casing and lubricant may be supplied to the latter passage in any suitable manner as by means of the cup 37. From Fig. 3 it will be evident that the lubricant will pass from the cup 37 through the passages 36 and 35 and the arms 30 to the passages 27 in the trunnions and thence into the roller bearing 25.

Conduits 38 for the motor wiring or for any other desirable purpose extend transversely across the clutch casing and are secured in the side walls thereof, as indicated at 39 and 40 in Fig. 3.

The rearward end of the shaft 16 is enlarged within the casing 15 and provided with gear teeth 41 on the exterior of the enlargement. The enlarged end is cupped out to receive a bearing 42 which supports the end 43 of the gear shaft 44, the rearward end of this shaft being supported in a bearing 45 in the rear wall of the transmission gearing casing. On the exterior of the casing the shaft 44 is provided with a flange 46 to which a universal joint or other suitable form of connection may be attached. The shaft 44 is preferably provided with a plurality of keys 47 and has slidably arranged thereon the gears 48 and 49. The gear 48 has internal teeth 50 adapted to mesh with the teeth 41 to form a direct connection between the shafts 16 and 44. A counter-shaft 51 is mounted in the bearings 52 and 53 and has keyed thereon the gear 54 which constantly meshes with the teeth 41. The shaft 51 also has keyed thereon the gears 55, 56 and 57, the gear 48 being adapted to be moved into mesh with the gear 55 and the gear 49 being adapted to be moved into mesh with the gear 56. An intermediate gear 58 is mounted on the short shaft 59 (see Fig. 4) and permanently meshes with the gear 57. The gear 49 is adapted to be moved into mesh with the gear 58, as shown in Fig. 2, so that the shaft 44 may have its direction of rotation reversed from that of the shaft 16.

The casing 15 is provided with an opening 60 in the side thereof through which the gear 58 slightly projects and a pump 61 is secured on the exterior of the casing 15 and operated by a shiftable gear 62, which is arranged to be driven from the gear 58. The gear 62 is moved into and out of mesh with the gear 58 by any suitable mechanism such as the arm 63, which is mounted on the vertical shaft 64. The shaft 64 projects through the casing 65 of the pump and carries exteriorly of the casing an arm 66 with which a spring 67 is connected. From Fig. 4 it will be seen that by swinging the arm 66 to carry the axis of the spring over the axis of the shaft 64, the spring will then automatically continue the movement and shift the gear 62 into mesh with the gear 58. When the arm 66 is in the position shown in Fig. 4 it is automatically held by the spring 67.

In order to shift the gears 48 and 49 into and out of mesh with the gears which are arranged to coöperate therewith, two shiftable elements 68 and 69, preferably in the form of rods arranged to move parallel with the axis of the shaft 44, are provided. These rods have their ends mounted in bearings in the front and rear walls of the gear casing, two of these bearings being indicated at 70 in Fig. 4. The ends of the rods 68 and 69 are inclosed in tubes 71 and these tubes have arranged in the outer ends thereof adjustable plugs 72 which are adapted to be engaged by the ends of the rods 68 and 69 to limit the movement of the rods. Any suitable means may be provided for securing the plugs 72 in their proper position and for this purpose locking wires 73 are indicated on the drawings.

The rod 68 has secured thereon an arm 74 having a yoke 75 at its end which engages the grooved hub 76 of the gear 48. The rod 69 has secured thereon an arm 77 having a yoke 78 at its end which engages the grooved hub 79 of the gear 49. The gears 48 and 49 are thus operatively connected with the rods 68 and 69, respectively, and partake of the movements of the latter.

A shaft 80 is arranged in the upper part of the casing 15 and mounted in suitable bearings 81 and 82, which are secured to the side walls of the casing. A brake pedal 83 and a clutch pedal 84 are mounted on the tubular extension 85 of the bearing 82. The link 34 is connected with the pedal 84 so as to be actuated thereby. The shaft 80 projects beyond the outer end of the tubular extension 85 and is provided with a flange 86 at its outer end, with which a suitable actuating lever not shown, commonly known as the gear shift lever, may be connected. The shaft 80 is arranged to be moved axially in the bearings 81 and 82 and carries on one end a washer or plate 87 which is adapted to engage an abutment 88 to limit the axial movement of the shaft in one direction. An arm 89 is secured on the shaft 80 and has its lower end arranged to coöperate with the rods 68 and 69, these rods being provided with transverse grooves 90 and 91, respectively, into which the end 92 of the arm 89 is adapted to project. When the rods 68 and 69 are in their neutral positions the grooves 90 and 91 are in alinement so that the end 92 of the arm 89 may be shifted from the groove 90 to the groove 91 or vice versa. From Fig. 2 it will be evident that by rocking the shaft 80 the rod 68 may be shifted, and when the shaft 80 is shifted axially to move the end 92 of the arm 89 into the groove 91 of the rod 69 the latter will be shifted by rocking the shaft 80. On account of the grooves 90 and 91 being in alinement only when the rods 68 and 69 are in their neutral positions, it is evident that the connection between the arm 89 and the rods may be shifted only when the rods and the gears which they actuate are in their neutral positions.

It is necessary to secure one of the rods 68, 69 against movement when the other rod is operatively connected with the arm 89 in order to prevent the accidental shifting of the rods, and for this purpose there is provided a locking bolt 93. This bolt is arranged to move transversely of the rods 68 and 69 and is provided in its upper side with a groove 94 through which either of these rods may be moved when operatively connected with the arm 89. The rods 68 and 69 are provided with grooves 95 and 96, respectively, which are in alinement when the rods are in their neutral positions and through which the bolt 93 may be moved. The bolt 93 is wholly supported by a member or bracket 97 which is detachably secured to the side wall of the casing 15. Said bracket has spaced bearing parts 197 and 198 in which the bolt slides, being secured against turning in any suitable manner. The bolt is preferably of tubular form and has slidably arranged in its outer end a plunger 98, the inner end of which carries a roller 99 coöperating with the lower end of an extension 100 of the arm 89. The plunger 98 is normally pressed inwardly by a spring 101, which coöperates with the inner end of the plunger and with a cap 102 secured on the outer end of the bolt 93. The bolt 93 carries a roller 103 which coöperates with the roller 99 to cause the bolt to be moved with the axial movements of the shaft 80. In the drawings the parts are shown in the neutral position and from Fig. 4 it will be seen that the lower end of the extension 100 is of triangular cross section and provided with a recess 104, which receives the roller 99 to hold the parts in their neutral positions. When the shaft 80 is rocked, the roller 99 leaves the recess 104 and coöperates with the edges 105 and 106 of the extension 100 to assist the operator in rocking the shaft 80 and thereby sliding the gears into meshing position and to yieldingly hold them in such position. From Fig. 2 it will be evident that when the bolt 93 is shifted inwardly from the position shown, the groove 94 in the bolt will be moved into alinement with the rod 69 and the bolt will secure the rod 68 against movement. At the same time the end 92 of the arm 89 is shifted from the groove 90 to the groove 91, so that when the shaft 80 is rocked the rod 69 will be actuated. The outer end of the bolt is inclosed in a suitable cap or casing 107.

The operation of the various parts of the mechanism having been described, it is believed that a general description of the operation of the whole mechanism would be superfluous and therefore the same is omitted.

The drawings illustrate what is now considered the preferred form of the invention, but it will be understood by those skilled in the art that various changes may be made in the details without departing from the spirit of the invention as defined in the appended claims.

Having thus described my invention, what I claim and desire to secure by Letters Patent is:—

1. In a motor vehicle, in combination, a motor crank case having a flywheel inclosing part, said part having an open flanged end, a clutch casing having an open front end secured to said flanged end and having a bearing supporting rear end, a gear casing having an open front end secured to the rear end of the clutch casing and having a bearing supporting rear end, a flywheel in said crank case inclosing part, a clutch mounted on the flywheel and housed within said clutch casing, gears in said gear casing and connected to be operated by said clutch, and bearings in said bearing supporting ends of said casings for said clutch and gears.

2. In a motor vehicle, in combination, a motor crank case having a flywheel inclosing part, said part having an open flanged end, a clutch casing having an open front end secured to said flanged end and having a bearing supporting rear end, a gear casing having an open front end secured to the rear end of the clutch casing and having a bearing supporting rear end, a flywheel in said crank case inclosing part, a clutch mounted on the flywheel and arranged partly within the crank case inclosing part and partly within said clutch casing, gears in said gear casing and connected to be operated by said clutch, and bearings in said bearing supporting ends of said casings for said clutch and gears.

3. In a motor vehicle, in combination, a motor crank case, a clutch casing detachably secured thereto, a gear casing detachably secured to the clutch casing, a clutch and operating mechanism therefor in the clutch casing, gears and shifting mechanism therefor in the gear casing, a clutch lever and a gear shift lever mounted on the gear casing, and connections from said levers to their respective mechanisms.

4. In a motor vehicle, in combination, a motor crank case, a clutch casing detachably secured thereto, a gear casing detachably secured to the clutch casing, a clutch and operating mechanism therefor in the clutch casing, gears and shifting mechanism therefor in the gear casing, a clutch lever and a gear shift lever mounted on one side of the gear casing, and detachable connections from said levers to their respective mechanisms.

5. In a motor vehicle, the combination of a casing, gears therein, a rock shaft connected for controlling the operation of said gears, a bearing for said rock shaft, and a pedal lever mounted on said bearing independently of the rock shaft.

6. In a motor vehicle, the combination of a casing, gears therein, a rock shaft connected for controlling the operation of said gears, a bearing for said rock shaft, and a clutch pedal and a brake pedal mounted on said bearing independently of the rock shaft.

7. In a motor vehicle, the combination of a casing, gears therein, a rock shaft connected for controlling the operation of said gears, a bearing member detachably secured to said casing and extending laterally therefrom, said rock shaft being mounted to turn in said bearing member, and a pair of pedal levers mounted to turn on the outside of said bearing member.

8. In a motor vehicle, a casing provided with alined bearings in two of its opposite walls, a rock shaft mounted in said bearings, one of said bearings having an axial extension outside of the casing, and a pedal lever rotatively mounted on said extension independently of the rock shaft.

9. In a motor vehicle, a casing provided with alined bearings in two of its opposite walls, a rock shaft mounted in said bearings, one of said bearings having an axial extension outside of the casing, a brake lever and a clutch lever mounted on said extension independently of the rock shaft.

10. In a motor vehicle, a casing provided with a bearing extending laterally from one side thereof, mechanism within the casing, means for controlling said mechanism including a member extending through said bearing, and a pedal lever rotatively mounted on the outside of said bearing independently of said member.

11. In an apparatus of the class described, in combination, transmission mechanism, a casing surrounding said mechanism, and a wire conduit extending through said casing and having its ends open and secured to the opposite side walls of the casing.

12. In an apparatus of the class described, in combination, a friction clutch, a casing surrounding said clutch, and a wire conduit extending through said casing below said clutch having its ends open and secured to the opposite side walls of the casing.

In testimony whereof I affix my signature.

JESSE G. VINCENT.